Nov. 19, 1957  J. JALBERT  2,813,735
DRAG LINK BALL JOINT
Filed March 14, 1955
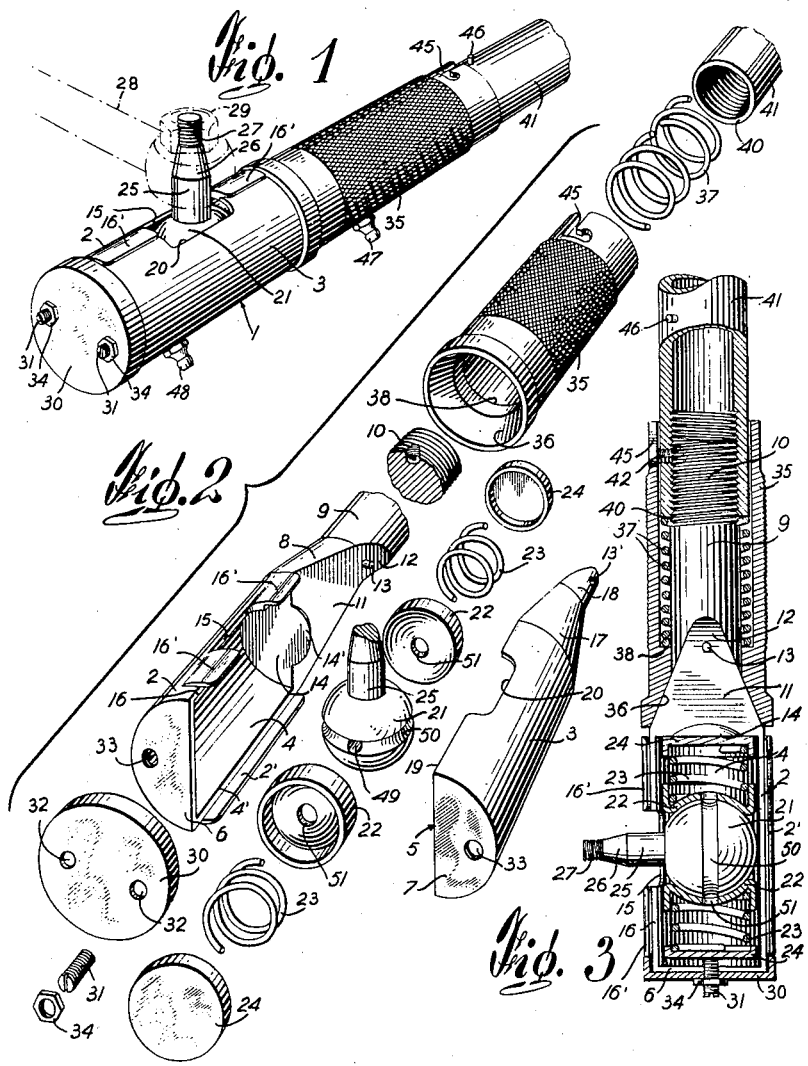
INVENTOR
Joseph JALBERT
BY
ATTORNEYS

United States Patent Office 2,813,735
Patented Nov. 19, 1957

2,813,735

DRAG LINK BALL JOINT

Joseph Jalbert, Baie Comeau, Quebec, Canada

Application March 14, 1955, Serial No. 493,961

5 Claims. (Cl. 287—90)

The present invention relates to a ball joint and more particularly to a drag link ball joint for the steering systems of motor vehicles.

Conventional drag link ball joints are difficult to assemble and take apart due to the existence of coil springs exerting a strong resilient action on the ball, the ball joint parts having to be assembled or taken apart by applying a counterforce substantially equal and opposite to the force exerted by said springs.

Accordingly, provision of a ball joint of the character described which will be simple and easy to assemble and take apart and which will provide a secure joint when in assembled position and which will not come apart due to the wear of its various elements is the general object of the present invention.

Another important object of the present invention is the provision of a ball joint of the character described in which the parts are assembled and disassembled in a direction transverse to the action of the ball retaining springs.

Still another important object of the present invention is the provision of means for adjusting the resilient action of the ball retaining springs.

Yet another important object of the present invention is the provision of a ball joint of the character described which is relatively inexpensive and simple to manufacture.

The foregoing and other important objects of the present invention will become more apparent during the following disclosure and by referring to the drawings in which:

Figure 1 is a perspective view of the assembled ball joint;

Figure 2 is an exploded perspective view of the disassembled ball joint; and

Figure 3 is a longitudinal section of the assembled ball joint.

Referring now more particularly to the drawings in which like reference characters indicate like elements throughout, the ball joint comprises a housing, generally indicated at 1, made of two parts 2 and 3. The main portions of each part 2 and 3 form longitudinally split half cylinders which are hollowed out to provide half cylindrical cavities 4 and 5. The outer ends of the parts 2 and 3 are closed by means of semicircular plates 6 and 7 respectively.

The inner end of the housing part 2 is extended into a tapered frusto-conical solid portion 8 integral with a cylindrical stem 9 which has a threaded outer end portion 10. The tapered portion 8 forms a flat inclined isosceles triangular face 11 which is slightly concave at its small end 12. The latter joins with the cylindrical outer face of the stem 9 and a pin or stud 13 projects therefrom.

The cavity 4 of the housing part 2 is defined at one end by the semicircular plate 6 and at its other end by the inner surface 14; said plate 6 and surface 14 extends substantially at right angles to the longitudinal axis of the part 2. A curved plate-like projection 14' extends the surface 14 and is adapted to enter a mating recess in the housing part 3 to properly position the two housing parts with respect to each other.

The housing part 2 is provided with a recess 15 made in the upper longitudinal edge 16 at substantially the middle thereof.

The half cylindrical housing part 3 is provided with a tapered frusto-conical extension 17 which is terminated by a substantially cylindrical tip 18 provided with a hole 13' for receiving the pin or stud 13.

The upper edge 19 of the housing part 3 is provided, at substantially its middle portion, with a recess 20 adapted to register with the recess 15 of housing part 2. Ears or lugs 16' extend on both sides of the recess 15 at the upper edge 16 and are adapted to overlie the opposite upper edge 19 of the housing part 3. Similarly, a flange 2' projects from the lower edge 4' of the housing part 2 and is adapted to overlie the opposite lower edge of the housing part 3. The frusto-conical portion 17 has an inclined substantially flat face, terminated by a convex portion, which is adapted to contact the flat face 11. When assembled, the parts 2 and 3 form a housing having a cylindrical cavity adapted to receive the ball 21, and on two opposite sides of said ball a concave cap 22, a coil spring 23, and a cap 24. In assembled position, the ball 21 is retained in said housing by means of the caps 22 which are spring pressed by the springs 23 on each side of the ball 21.

A spindle 25 is secured to the ball 21 and projects through the registering recesses 15 and 20 of the housing 1. Said spindle 25 is tapered at 26 and is terminated by a threaded portion 27; the pitman arm 28, shown in dot and dash line, is rotatably connected to the spindle 25 and is retained thereon by means of nut 29 engaging the threaded portion 27 of said spindle 25.

The outer end portions of the housing parts 2 and 3 are maintained together by means of a flanged cover 30 of circular shape and are adapted to overlie the cylindrical outer portions of the parts 2 and 3. The flanged cover 30 is retained on the housing parts 2 and 3 by means of set screws 31 and nuts 34. The set screws 31 engage holes 32 made in the cover 30 and registering threaded holes 33 made in the end plates 6 and 7 of the housing parts 2 and 3. The set screws 31 engage the outer end cap 24 and serve to adjust the position of the same in order to adjust the resilient action of the springs 23 on the ball 21. Once adjusted the set screws 31 are locked by means of the nuts 34 which also serve to secure the cover 30.

A sleeve 35 surrounds the stem 9 and is axially displaceable thereover in order that its tapered or frusto-conical internal end face 36 may engage the frusto-conical tapered portions 8 and 17 of the assembled housing parts 2 and 3 to maintain the latter together. The sleeve 35 is urged into engagement with said tapered parts 8 and 17 by means of a coil spring 37 extending within the sleeve 35 and surrounding the stem 9. One end of the coil spring 37 abuts against an internal shoulder 38 of sleeve 35 made adjacent the tapered end 36 of the latter. The other end of coil spring 37 abuts against the end 40 of the tubular drag link 41, which is threadedly connected to the portion 10 of the stem 9. A set screw 42 serves to lock the drag link 41 to the threaded portion 10 of the stem 9. To assemble the drag link ball joint according to the present invention, the ball 21, caps 22, springs 23 and caps 24 are assembled together and pressed against each other and inserted into the hollow cavity 4 of the housing part 2. Then the housing part 3 is brought in register with housing part 2 to completely enclose the above mentioned elements, the stud 13 engaging the hole 13', and the sleeve 35 is allowed to move axially along the stem 9 under the action of spring 37 to engage the tapered parts 8 and 17 of the housing. Finally, the flanged cover is secured to the end plates 6 and 7 of the housing by means of nuts 34 engaging set screws 31 which are adjustably screwed to change the action of the springs 23 on the ball 21.

The sleeve 35 is provided at its outer end with an L-shaped slot 45 which is engageable by a stud 46 projecting from the drag link 41. When it is desired to disassemble the ball joint, the stud 46 is made to engage the slot 45 to hold the sleeve 35 in retracted position disengaging the tapered parts 8 and 17 of the housing.

The ball joint, according to the present invention, is secured in use because the housing parts 2 and 3 are positively held together at both ends by the sleeve 35 and the end cover 30 respectively. But said ball joint is easily disassembled by sliding the sleeve 35 away from engagement with the tapered parts 8 and 17 and by removing the end cover 30; then the parts 2 and 3 may be taken apart without effort because they are moved in a direction perpendicular to the action of the coil springs 23.

The set screw 42 engages the L-shaped slot 45 of the sleeve 35 to prevent accidental retraction of the latter during use of the ball joint. To disassemble the ball joint, the set 42 has to be removed.

In order to lubricate the ball joint, there are provided lubrication fittings 47 and 48 secured to the sleeve 35 and housing part 3 respectively. The fitting 47 serves to lubricate the spring 37 while the fitting 48 serves to lubricate the parts within the housing 1. To obtain uniform lubrication of said last named parts, the ball 21 is provided with a through bore 49 and a groove 50 while the caps 22 are apertured as shown at 51.

While a preferred embodiment according to the present invention has been illustrated and described it is understood that various modifications may be resorted to without departing from the spirit and scope of the appended claims.

I claim:

1. A ball joint of the character described comprising a ball, a spindle on said ball for connection to an arm, spring pressed concave parts disposed against opposite portions of said ball, a two-part housing consisting of two half cylinders and in which said ball and said spring pressed concave parts are located, one of said housing parts having means for connection to a drag link, each of said half cylinders having a tapered portion near one end thereof, said tapered portions being axially coextensive, and a sleeve slidably mounted on one of said housing parts and spring pressed for engagement with the tapered portions of said housing parts for maintaining said housing parts in assembled position.

2. A ball joint as claimed in claim 1, wherein said means for connection to a drag link include a stem integral with said one of said housing parts and having a threaded connection with said drag link.

3. A ball joint as claimed in claim 1, further including means to removably retain said sleeve in an inoperative position disengaging said tapered portions of said housing parts to permit disassembly of said housing parts.

4. A ball joint as claimed in claim 1, wherein said tapered portions form a frustum of a cone when said housing parts are in assembled position.

5. A ball joint as claimed in claim 4, wherein said sleeve has an inner surface portion in the form of a frustum of a cone for engaging said frusto-conical assembled portions of said housing parts.

References Cited in the file of this patent

UNITED STATES PATENTS

| 216,747 | Manny | June 24, 1879 |
| 2,067,553 | Todd | Jan. 12, 1937 |

FOREIGN PATENTS

| 18,247 | France | 1914 |
| 363,721 | France | 1906 |
| 975,118 | France | 1951 |